Figure 1:
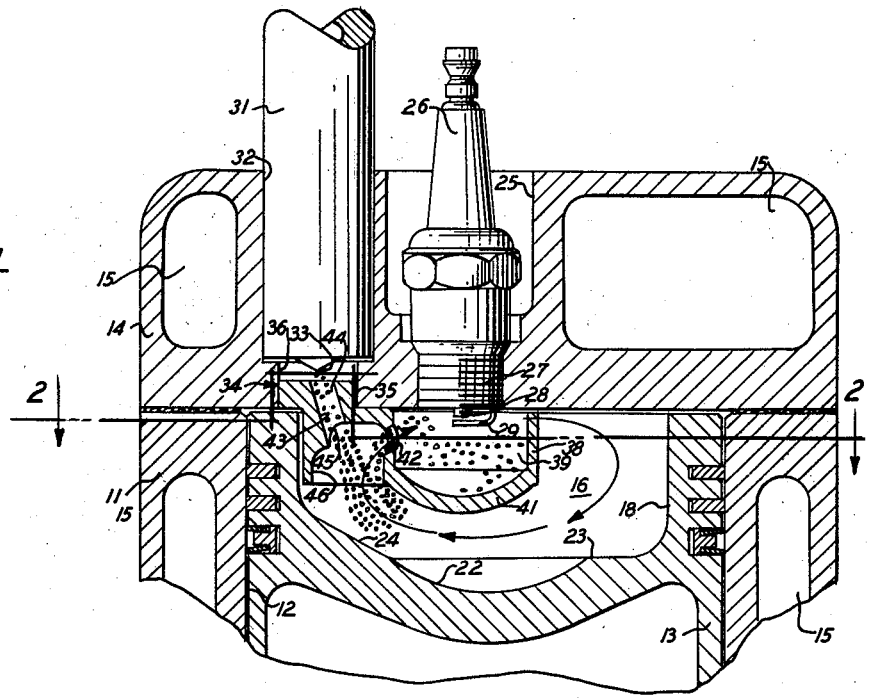

July 20, 1965     I. N. BISHOP ETAL     3,195,519
COMBUSTION CHAMBER FOR AN INTERNAL COMBUSTION ENGINE
Filed March 28, 1963

IRVING N. BISHOP
LASZLO HIDEG
INVENTORS

BY John R. Faulkner
Ernest A. Beutler
ATTORNEYS

United States Patent Office 3,195,519
Patented July 20, 1965

3,195,519
COMBUSTION CHAMBER FOR AN INTERNAL COMBUSTION ENGINE
Irving N. Bishop, Farmington, and Laszlo Hideg, Dearborn, Mich., assignors to Ford Motor Company, Dearborn, Mich., a corporation of Delaware
Filed Mar. 28, 1963, Ser. No. 268,761
14 Claims. (Cl. 123—32)

This invention relates to a combustion chamber for an internal combustion engine and more particularly to a combustion chamber that allows unthrottled engine operation.

An internal combustion engine operating upon a conventional combustion process can only realize its maximum possible efficiency at full power for several reasons. Since in many applications an internal combustion engine is rarely called upon to develop its full power, an engine running on the conventional combustion process cannot be operated as economically as would otherwise be possible.

When running upon a conventional combustion process, a substantially homogeneous mixture of fuel and air is present in the combustion chamber at a time of ignition. Since there must be an ignitable mixture present at the time of ignition, there is an overabundance of fuel present in the combustion chamber except when full power output is required. That is, although there must be a locally rich mixture to initiate combustion, there is more fuel present in the chamber than is required to provide the desired power at partial loads. Therefore, a high specific fuel consumption at light and medium loads is unavoidable with a conventional engine.

Because of the overabundance of fuel at light loads, the power output must be regulated by throttling the intake air. The restriction to air flow caused by throttling raises the temperature of the air charge in the cylinder and decreases the engine's volumetric efficiency. The heated air charge also increases the possibility of preignition necessitating the use of either lower compression ratios or higher octane fuels. The throttling of intake air in a conventional engine thus further increases the cost of operation by decreasing volumetric efficiency and by decreasing the thermal efficiency through the necessity of employing lower compression ratios or, alternately, by requiring the burning of higher cost fuels.

It is, therefore, the principal object of this invention to provide a combustion chamber that permits the unthrottled operation of an internal combustion engine.

It is still a further object of this invention to provide an improved combustion chamber that permits the establishment of a locally rich fuel-air mixture for the initiation of combustion at partial loads.

An internal combustion engine embodying this invention has a cylinder head, piston and cylinder bore defining a main combustion chamber. In addition, an auxiliary combustion chamber, separated at least in part from the main combustion chamber by a wall, is provided. At least one opening in the wall between the chambers permits air transfer. A fuel injection nozzle is disposed to inject a stream of fuel particles into the main combustion chamber contiguous to the opening. The configuration of the main combustion chamber and the positioning of the opening are such that an air flow is set up from the main combustion chamber into the auxiliary combustion chamber through the opening as the piston approaches top dead center. The air flow sweeps a portion of the injected fuel particles into the auxiliary combustion chamber to provide a locally rich fuel-air mixture therein for initiating combustion.

Figure 2:
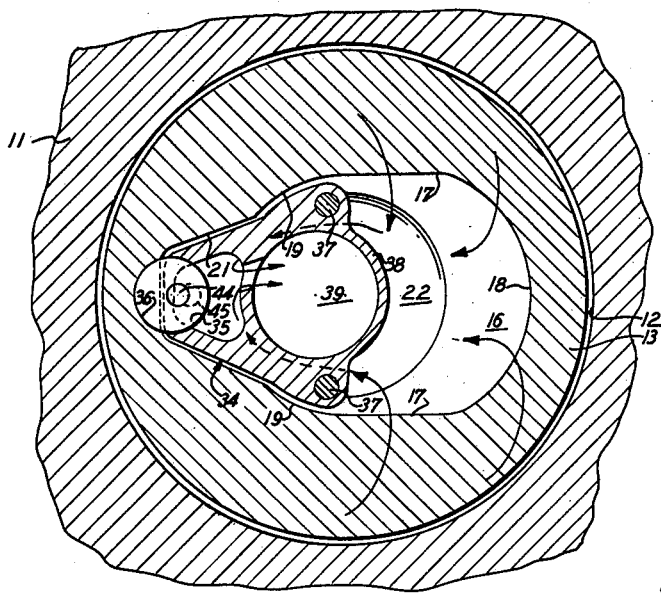

Further objects and advantages of this invention will become more apparent when considered in conjunction with the accompanying drawings, wherein:

FIGURE 1 is a cross sectional view taken along the axis of a cylinder of an internal combustion engine embodying this invention; and FIGURE 2 is a cross sectional view taken along line 2—2 of FIGURE 1.

Referring now in detail to the drawings, there is indicated at 11 a cylinder block having a cylinder bore 12. Reciprocally received in the cylinder bore 12 is a piston 13 that is connected by a connecting rod to the crankshaft (not shown). Affixed to the cylinder block 11 and enclosing the cylinder bore 12 is a cylinder head 14. The cylinder block 11 and cylinder head 14 are provided with cavities 15 for the circulation of a coolant throughout the engine.

A cavity indicated generally at 16 is formed in the head of the piston 13. The cavity 16 comprises a major portion of the clearance volume when the piston 13 is at its top dead center position. The cavity 16 has parallel vertically extending side walls 17 connected at one end by a cylindrical segment 18. At the other end, the side walls 17 terminate in cylindrical segments 19 that merge into a wedge-shaped section 21. At a point on the axis of the cylinder bore 12, the cavity 16 is formed with a lower wall portion 22 which is a section of a sphere. Three sides of the lower wall portion 22 merge into a flat lower wall portion 23 that terminates at side walls 17 and cylindrical segment 18. The fourth side of the lower wall portion 22 merges into a lower wall portion 24 that is inclined upwardly and terminates at the wedge-shaped section 21.

An opening 25 is formed in the cylinder head 14 for the reception of a spark plug 26. The spark plug 26 is threaded into the cylinder head 14 as at 27 in a vertical position, offset to one side of the axis of the cylinder bore 12. Ignition terminals 28 and 29 extend into the clearance volume. The ignition terminals 28 and 29 further lie below the upper surface of the piston 13 and within the cavity 16 when the piston 13 is at its top dead center position (FIGURE 1).

A fuel injection nozzle 31 is received in a cavity 32 formed in the cylinder head 14. The fuel injection nozzle 31 also extends vertically adjacent to the spark plug 26 in a plane with the spark plug 26 and the axis of cylinder bore 12.

The fuel injection nozzle 31 is offset to one side of the cylinder bore 12 and overlies the periphery of the cavity 16 above wedge-shaped section 21. The fuel injection nozzle 31 is formed with a discharge orifice 33, the axis of which intersects the cavity 16 when the piston 13 is at top dead center.

An insert, indicated generally at 34, is formed with a cylindrical portion 35 that is press fitted into a bore 36 in the cylinder head 14 concentric with the injection nozzle 31. Dowel pins 37 are additionally provided to fix the position of the insert 34 (FIGURE 2). The insert 34 is provided with a wall 38 that surrounds the spark terminals 28 and 29 to define a partially enclosed cavity 39. The cavity 39 has a circular cross section in a plane transverse to the axis of the cylinder bore. The center of the cavity 39 coincides with the spark gap. The cavity 39 is bounded by a lower curved wall 41. The wall 38 terminates below the lower surface of the cylinder head 14, leaving a clearance therebetween. An opening 42 in the wall 38 permits air flow between the cavity 39 and the remainder of the clearance volume.

A fuel discharge channel 43 is additionally provided in the insert 34. The fuel discharge channel 43 terminates at its upper end in an inlet port 44 that is positioned contiguous to the discharge orifice 33 of the injection nozzle 31. The lower end of the discharge channel 43 terminates at an outlet port 45 that is positioned in a cavity 46 formed in the insert 34 adjacent to the side wall 38. The outlet port 45 is also positioned contiguous to the opening 42 in the wall 38.

The axis of the fuel discharge channel 43 is not aligned with the axis of the discharge orifice 33 of the injection nozzle 31. Because of this nonalignment, fuel particles issuing from the discharge orifice 33 impinge upon the sides of the discharge channel 43 to disperse the impinging particles and to direct a portion of the particles toward the opening 42.

*Operation*

Although the disclosed combustion chamber may be utilized with either a two or four stroke cycle engine, four cycle operation will be discussed. During the intake stroke with the intake valve open, a charge of unthrottled pure air is drawn into the cylinder bore 12. The charge of air is compressed as the piston 13 moves from its bottom to its top dead center position. At a time during the compression stroke that is dependent upon load, the introduction of fuel is commenced. As fuel injection takes place, a portion of the fuel particles emitted by the discharge orifice 33 of the injection nozzle 31 impinge upon the side walls of the fuel discharge channel 43 for dissipation and dispersion within the cylinder bore 12.

As the piston 13 approaches its top dead center position, an air flow pattern is set up in the combustion chamber. The direction of air flow is indicated by the arrows in the drawings. The opening 42 is situated in such a position that an air flow is set up from the cylinder bore 12 through the opening 42 into the cavity 39. Air may also flow out of the cavity 39 through the clearance between the upper end of the wall 38 and the lower face of the cylinder head 14.

The injection of fuel is continued until the piston is at or nearly at top dead center. A portion of the later injected fuel particles are swept by the air flow through the opening 42 into the cavity 39. The particles that enter the cavity 39 will normally be the smaller particles dispersed by impingement upon the walls of the discharge channel 43.

As has been noted, the injection timing is dependent upon engine load. The fuel is injected at a constant rate relative to engine crank velocity. However, as the load increases, the beginning of injection is advanced to supply sufficient fuel to produce the desired power. The termination of injection, however, is substantially fixed at a point close to top dead center of the piston 13. At light loads, therefore, a lean fuel mixture will be present in the combustion chamber. A richer mixture will be present in the cavity 39, however. Because of the presence of the rich mixture in the cavity 39, there is always a stoichiometric mixture present around the spark terminals 28 and 29 at the time of ignition.

When the spark plug fires, the flame will propagate rapidly throughout the cavity 39 and be emitted from the opening 42 and the clearance between the wall 38 and the lower surface of the cylinder head 14. The flame will raise the temperature of the charge in the remainder of the combustion chamber to cause complete burning even though the mixture would be too lean to support the initial combustion.

It should be readily apparent that by providing a locally rich mixture adjacent to the spark plug terminals and by varying the amount of fuel present in the combustion chamber dependent upon load, unthrottled engine operation is possible. In addition, the engine will operate with a high volumetric and thermal efficiency because there is no throttling of the intake air and because there is full air utilization at all loads.

It is to be understood that various changes and modifications may be made without departing from the spirit and scope of the invention, as defined by the appended claims.

We claim:

1. An internal combustion engine having a cylinder head, a cylinder bore and a piston defining a main combustion chamber, an auxiliary combustion chamber associated with said said main combustion chamber and separated therefrom, passage means connecting said chambers for air transfer, and a fuel injection means associated with said main combustion chamber for injecting a stream of fuel into said main combustion chamber past said passage means, said passage means being located in the path of movement of an air stream generated in said main combustion chamber by the piston approaching top dead center to effect an air transfer from said main combustion chamber into said auxiliary combustion chamber through said passage means, a portion of the injected fuel particles being transferred by said air into said auxiliary combustion chamber to provide a locally combustible fuel-air mixture in said auxiliary combustion chamber.

2. An internal combustion engine having a cylinder head, a cylinder bore and a piston defining a main combustion chamber, an auxiliary combustion chamber within said main combustion chamber and separate therefrom, an ignition device within said auxiliary combustion chamber, passage means connecting said chambers for air transfer, and a fuel injection means associated with said main combustion chamber for injecting a stream of fuel into said main combustion chamber past said passage means, said passage means being located in the path of movement of an air stream generated in said main combustion chamber by the piston approaching top dead center to effect an air transfer from said main combustion chamber into said auxiliary combustion chamber through said passage means, a portion of the injected fuel particles being transferred by the air into said auxiliary combustion chamber to provide a locally combustible fuel-air mixture in said auxiliary combustion chamber for ignition by said ignition device.

3. An internal combustion engine comprising a cylinder block having a bore, a piston reciprocating in said bore, a cylinder head enclosing said bore to form a main combustion chamber, an auxiliary combustion chamber within said main chamber and separated from said main combustion chamber by a wall, at least one opening in said wall connecting said chambers for air transfer, a fuel injection nozzle disposed to inject a stream of fuel into said main combustion chamber, and an impingement surface disposed in the path of at least a portion of the stream of fuel particles for causing dispersion of the particles and for deflecting a portion of the particles past said opening, said opening being located in the path of movement of a portion of an airstream generated in said main combustion chamber by the piston approaching top dead center to effect an air transfer from said main combustion chamber into said auxiliary combustion chamber through said opening, a portion of the deflected fuel particles being swept by the transfer air through said opening into said auxiliary combustion chamber to provide a locally combustible fuel-air mixture in said auxiliary combustion chamber.

4. An internal combustion engine comprising a cylinder block having a bore, a piston reciprocating in said bore, a cylinder head enclosing said bore to form a main combustion chamber, an auxiliary combustion chamber within said main chamber separated at least in part from said main combustion chamber by a wall, an ignition device located in said auxiliary combustion chamber, at least one opening in the wall connecting said chambers for air transfer; a fuel injection nozzle disposed to inject a stream of fuel into said main combustion chamber, and an impingement surface disposed in the path of at least a portion of the stream of fuel particles for causing dispersion of the particles and for deflecting a portion of the particles past said opening, said opening being located in the path of movement of an air stream generated in said main combustion chamber by the piston approaching top dead center to set up an air transfer from said main combustion chamber into said auxiliary combustion chamber through said opening, a portion of the deflected fuel particles being swept by the transfer air through said opening and into said auxiliary combustion chamber to provide a locally combustible fuel-air mixture in said auxiliary combustion chamber for ignition by said ignition device.

5. An internal combustion engine having a cylinder head, a cylinder bore and a piston defining a main combustion chamber, an auxiliary combustion chamber within and surrounded by said main combustion chamber and separated at least in part from said main combustion chamber by a wall, an ignition device in said auxiliary combustion chamber, at least one opening in said wall connecting said chambers for air transfer, and a fuel injection nozzle disposed to inject a stream of fuel into said main combustion chamber past said opening, said opening being located in the path of movement of an air stream generated in said main combustion chamber by the piston approaching top dead center to set up an air transfer from said main combustion chamber into said auxiliary combustion chamber through said opening, a portion of the injected fuel particles being swept by the air transferred into said auxiliary combustion chamber to provide a locally combustible fuel-air mixture in said auxiliary combustion chamber for ignition by said ignition device.

6. An internal combustion engine having a cylinder head, a cylinder bore and a piston defining a main combustion chamber, an auxiliary combustion chamber within and surrounded by said main combustion chamber and separated at least in part from said main combustion chamber by a wall, an ignition device located in said auxiliary combustion chamber, at least one opening in said wall connecting said chambers for air transfer, a fuel injection nozzle disposed to inject a stream of fuel into said main combustion chamber, and an impingement surface in said main combustion chamber disposed in the path of at least a portion of the stream of fuel particles for causing dispersion of said particles and for deflecting a portion of the particles past said opening, said opening being located in the path of movement of an air stream generated in said main combustion chamber by the piston approaching top dead center to set up an air transfer from said main combustion chamber into said auxiliary combustion chamber through said opening, a portion of the deflected particles being swept by the air transfer through said opening into said auxiliary combustion chamber to provide a locally combustible fuel-air mixture in said auxiliary combustion chamber for ignition by said ignition device.

7. An internal combustion engine comprising a cylinder block having a bore, a piston reciprocating in said bore, a cylinder head enclosing said bore, a cavity formed between said piston and said cylinder head forming a major portion of the clearance volume when the piston is at its top dead center position, a wall extending from said cylinder head into said cavity and enclosing a portion of said clearance volume to form an auxiliary combustion chamber, a spark plug in said head having portions extending into said auxiliary combustion chamber, at least one opening in said wall connecting said auxiliary combustion chamber with the remainder of said clearance volume for air transfer, and a fuel injection nozzle in said cylinder head disposed to inject a stream of fuel into said cavity past said opening, said opening being located in the path of movement of an air stream generated in said clearance volume by the piston approaching top dead center position to set up an air transfer into said auxiliary combustion chamber through said opening, a portion of the injected fuel particles being swept by the air transfer into said auxiliary combustion chamber to provide a locally combustible fuel-air mixture in said auxiliary combustion chamber for ignition by said spark plug.

8. An internal combustion engine as defined in claim 7 wherein the cavity is formed in the piston.

9. An internal combustion engine comprising a cylinder block having a bore, a piston reciprocating in said bore, a cylinder head enclosing said bore, a cavity formed between said piston and said cylinder head forming a major portion of the clearance volume when said piston is at its top dead center position, a wall extending from said cylinder head into said cavity and enclosing a portion of said clearance volume to form an auxiliary combustion chamber, a spark plug in said head having portions extending into said auxiliary combustion chamber, at least one opening in said wall connecting said auxiliary combustion chamber with the remainder of said clearance volume for air transfer, said opening being located in the path of movement of an air stream generated by the piston approaching top dead center to set up an air transfer into said auxiliary combustion chamber through said opening, a fuel injection nozzle disposed to inject a stream of fuel into said cavity, and an impingement surface disposed in the path of at least a portion of the stream of fuel particles for causing dispersion of said particles and for deflecting a portion of the particles past said opening, at least a part of the deflected portion of said particles being swept by the air transfer into said auxiliary combustion chamber to provide a locally combustible fuel-air mixture in said auxiliary combustion chamber for ignition by said spark plug.

10. An internal combustion engine as defined in claim 9 wherein the cavity is formed in the piston.

11. An internal combustion engine comprising, a cylinder block having a bore therein, a piston reciprocably mounted in said bore, a cylinder head closing one end of said bore and together with said bore walls and piston defining a main combustion chamber, a spark plug in said head extending into the clearance volume defined by the piston at its top dead center position, a fuel injection nozzle in said cylinder head having a discharge orifice, the axis of said discharge orifice being positioned to intercept the clearance volume, and an insert supported in a fixed position relative to said cylinder head, said insert having a wall defining a partially enclosed area around said spark terminals and a fuel discharge channel having an entrance port contiguous to the discharge orifice of said injection nozzle, said wall having an opening for air transfer into the partially enclosed area from the remainder of the clearance volume, said fuel discharge channel terminating in an outlet port positioned adjacent said opening, said opening being located in the path of movement of an air stream generated by the piston approaching top dead center to set up an air transfer into the partially enclosed area, the axis of said fuel discharge channel being angularly disposed with respect to the axis of said discharge orifice for causing dispersion of the fuel particles emitted by said discharge orifice, a portion of the fuel dispersed in said main chamber being swept by the air transfer into said partially enclosed area to provide a locally combustible fuel-air mixture for ignition by said spark plug.

12. An internal combustion engine of the spark ignition type having a block with a cylindrical bore therein, a piston slidably mounted within said bore, a cylinder head closing one end of said bore, a cavity in the top of said piston together with said head defining a main combustion chamber, an auxiliary combustion chamber within said main chamber, a spark plug in said auxiliary chamber, said auxiliary chamber comprising a substantially cup-shaped wall member depending from said head into said main chamber and having a clearance space between the top of said auxiliary chamber and said head for the passage of air therebetween, said auxiliary chamber having an air and fuel opening at one side, fuel injection means in said head located adjacent said opening for directing fuel droplets past said opening into said main chamber, the squish action of said piston during its compression stroke causing a circulation of air through said opening and clearance space to effect a transfer of air and a portion of said fuel through said opening into said auxiliary chamber to a position adjacent said spark plug for ignition thereof.

13. An internal combustion engine of the spark ignition type having a block with a cylindrical bore therein, a piston slidably mounted within said bore, a cylinder head closing one end of said bore, a cavity in the top of said piston together with said head defining a main combustion chamber, an auxiliary combustion chamber within said main chamber, a spark plug in said auxiliary chamber, said auxiliary chamber comprising a substantially cup-shaped wall depending from said head into said main chamber and having a clearance space between the top of said auxiliary chamber and said head for the passage of air therebetween, said auxiliary chamber having an air and fuel opening at one side, fuel injection means for injecting fuel droplets into said main chamber, fuel discharge passage means cooperating with said fuel injector for directing said fuel into said main chamber and towards said opening, the squish action of said piston during its compression stroke causing a circulation of air through said opening and clearance space to effect a transfer of air and lighter particles of said fuel through said opening into said auxiliary chamber to a position adjacent said spark plug for ignition thereof.

14. An engine as described in claim 13, said passage means having an axis at an angle with respect to the axis of said ignition means whereby said fuel impinges against the sides of said passage effecting a dispersion of said fuel and a directing of a portion of said fuel towards said opening.

References Cited by the Examiner

UNITED STATES PATENTS

| | | | |
|---|---|---|---|
| 2,061,826 | 11/36 | Bremser | 123—32 |
| 2,086,427 | 7/37 | Mock | 123—32 |
| 2,893,360 | 7/59 | Muller | 123—32 |

FOREIGN PATENTS 1,037,756  8/58  Germany.

RICHARD B. WILKINSON, *Primary Examiner.*